United States Patent
Ebbesmeier née Schitthof

[11] Patent Number: 5,870,234
[45] Date of Patent: Feb. 9, 1999

[54] COMPACT WIDE-ANGLE LENS

[75] Inventor: Hiltrud Ebbesmeier née Schitthof, Schweppenhausen, Germany

[73] Assignee: Jos. Schneider Optische Werke Kreuznach GmbH & Co. KG, Bad Kreuznach, Germany

[21] Appl. No.: 923,567

[22] Filed: Sep. 4, 1997

[30] Foreign Application Priority Data

Sep. 6, 1996 [DE] Germany .................. 196 36 152.4

[51] Int. Cl.[6] ............... G02B 13/04; G02B 9/60; G02B 3/02
[52] U.S. Cl. ............ 359/752; 359/753; 359/761; 359/763; 359/770; 359/713; 359/714
[58] Field of Search ............. 359/752, 753, 359/761, 763, 770, 713, 714

[56] References Cited

U.S. PATENT DOCUMENTS

| | | | |
|---|---|---|---|
| 3,542,454 | 11/1970 | Hugues et al. | 359/761 |
| 3,567,310 | 3/1971 | Bertele | 359/752 |
| 3,601,473 | 8/1971 | Mandler et al. | 359/752 |
| 4,130,350 | 12/1978 | Koizumi | 359/770 |
| 4,211,472 | 7/1980 | Nakamura | 359/753 |
| 4,747,675 | 5/1988 | Nagler | 359/753 |
| 4,764,001 | 8/1988 | Yokota | 359/770 |
| 4,806,001 | 2/1989 | Okabe et al. | 359/752 |
| 5,528,428 | 6/1996 | Ohtake et al. | 359/770 |
| 5,621,575 | 4/1997 | Toyama | 359/753 |
| 5,663,836 | 9/1997 | Ogata | 359/714 |

FOREIGN PATENT DOCUMENTS

| | | |
|---|---|---|
| 0 262 407 | 4/1988 | European Pat. Off. . |
| 1 572 576 | 3/1970 | Germany . |
| 2849175 | 5/1979 | Germany .................. 359/770 |
| 1483 91 | 5/1981 | Germany . |
| 405 746 | 7/1966 | Switzerland . |
| 1 137 788 | 12/1968 | United Kingdom . |

*Primary Examiner*—David C. Nelms
*Assistant Examiner*—Evelyn A. Lester
*Attorney, Agent, or Firm*—Herbert Dubno

[57] ABSTRACT

This invention relates to a compact wide-angle lens which consists of five members. The first member and the last member are each divergent lenses of low deviation, which consist of low refractivity crown glass. The second member and the third member are convergent lenses made of high refractivity crown glass. The fourth member, which is the final member of the lens according to the invention, consists of a convergent lens and a divergent lens which are cemented to each other. Type of glass are used for this cemented member which have a very low difference in refractive index but a very high difference in dispersion. The convergent lens has a low dispersion and the divergent lens has a high dispersion. One of the two glass/air surfaces of the cemented member is aspherical. A lens such as this according to the invention has a maximum aperture ratio of at least 1:5.6 and an image angle of 105°. The chromatic correction is well defined and is very substantially independent of the distance of the object. Amongst other effects, this results in scarcely any losses of image quality occurring, even at short range. The distortion of the object is very low.

3 Claims, 1 Drawing Sheet

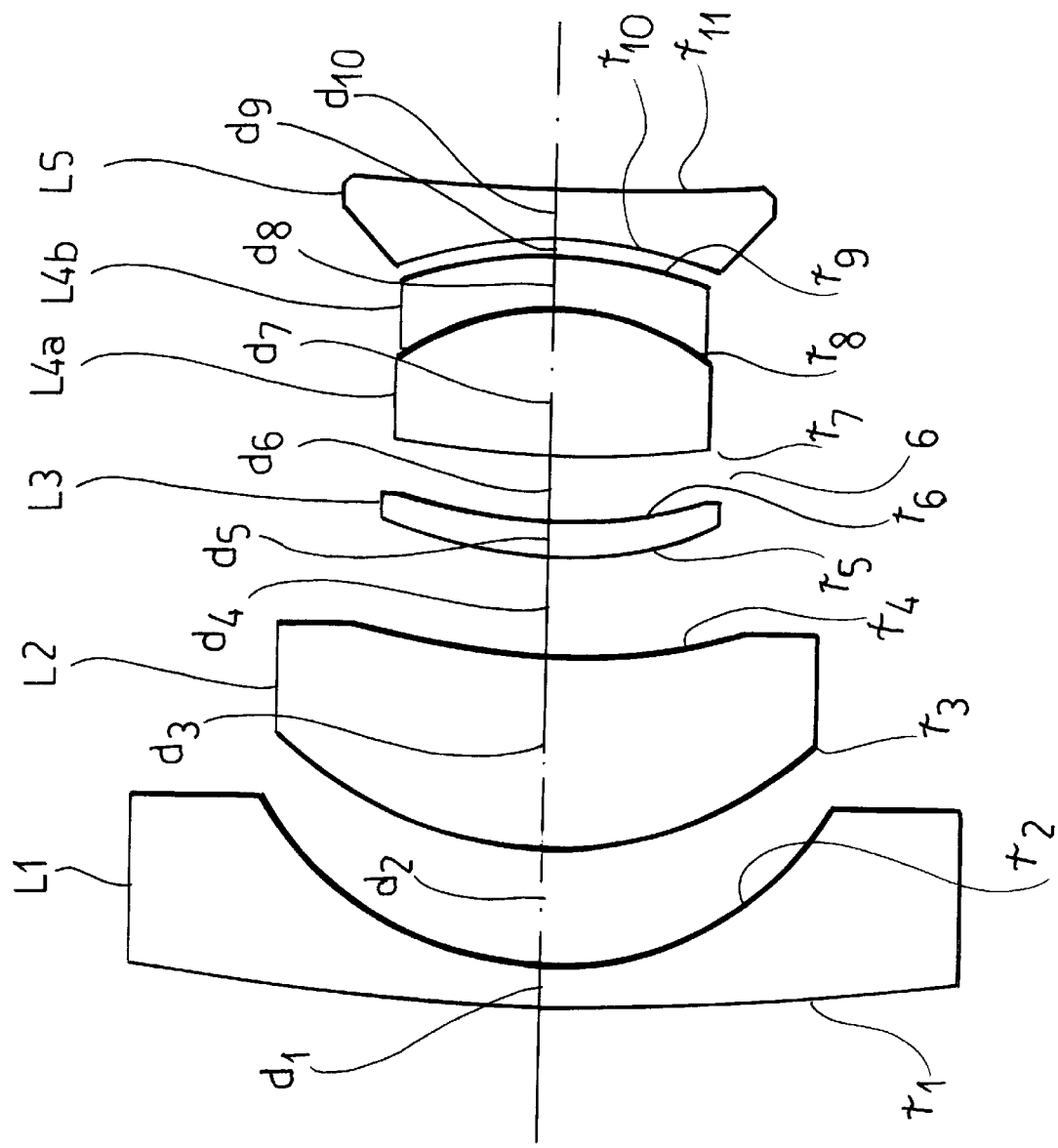

COMPACT WIDE-ANGLE LENS

BACKGROUND OF THE INVENTION

1. Field of the Invention

This invention relates to a compact wide-angle lens having a meniscus lens on the object side and a meniscus lens on the image side, which consists of five members and has a diaphragm between the third and fourth members.

2. Description of Related Art

Compact wide-angle lenses of this type are increasingly being used in the field of large-negative photography. Compared with conventional wide-angle lenses, they have shorter overall lengths, smaller lens diameters and a reduced weight. These advantages permit better utilisation of the adjustment options of a large-negative camera. The sensitivity to scale of compact wide-angle lenses is also less than that of conventional wide-angle lenses.

Compact wide-angle lenses are already known which comprise a dispersive meniscus lens both on the object side and on the image side.

DD WP 148 391 describes a wide-angle lens such as this, in which the central convergent lens part is constructed from four individual upright lens members. A meniscus lens with a cemented face is disposed in front of the diaphragm space in the direction of light. A disadvantage of this lens is that its unsymmetrical construction does not permit very large image angles.

Another compact wide-angle lens, which consists of six members with eight lenses, is claimed in EP 0 262 407. In this lens, the first lens member is constructed as a convex negative meniscus lens on the object side and the sixth lens member is of biconcave construction. This is claimed to result in a reduced overall length, and installation in cameras is improved due to the smaller lens diameter.

An approximately symmetrical wide-angle lens which is a double anastigmatic lens and which is described in DE OS 1 572 576 has a long overall length due to its eight lenses and is thus not a compact wide-angle lens in the actual sense of this term. Lenses of this type do in fact exhibit good sharpness and image field flatness, but do not permit high aperture numbers to be employed.

All these known compact wide-angle lenses are burdened with disadvantages. Thus troublesome chromatic aberrations, particularly colour defects, occur as magnifications become higher. Moreover, these compact wide-angle lenses do not enable such large image angles to be employed as those which are possible with conventional wide-angle lenses.

The aim of the present invention is therefore to create a compact wide-angle lens for which the said weaknesses of this type of lens do not arise.

SUMMARY OF THE INVENTION

The object of the present invention is to construct a compact wide-angle lens in which no disadvantageous falsifications occur in chromatic correction and in image quality, even at short range, and which is equivalent to the known, conventional wide-angle lenses as regards image angle, aperture ratio and distortion.

This object is achieved according to the invention by a five-membered lens, the first member and the last member of which are each divergent lenses of low deviation, which consist of low refractivity crown glass, wherein the face of the last member which faces the plane of the image is concave. The second member and the third member are convergent lenses made of high refractivity crown glass. The fourth member, which is the final member of the lens according to the invention, consists of a convergent lens and a divergent lens which are cemented to each other.

The types of glass which are used for this cemented member have a very low difference in refractive index but a very high difference in dispersion, wherein the convergent lens has a low dispersion and the divergent lens has a high dispersion. One of the two glass/air surfaces of the cemented member is aspherical. A diaphragm is disposed between the third member and the fourth member.

A lens such as this according to the invention has a maximum aperture ratio of at least 1:5.6 and an image angle of 105°. The chromatic correction is well defined and is very substantially independent of the distance of the object. Amongst other effects, this ensures that scarcely any losses of image quality occur, even at short range. The distortion of the object is very low. The invention is explained in more detail below with reference to examples of embodiments.

BRIEF DESCRIPTION OF THE DRAWING

The accompanying drawing (one FIGURE) is a schematic sectional view of the compact wide-angle lens according to the invention.

DETAILED DESCRIPTION OF PREFERRED EMBODIMENTS

The wide-angle lens according to the invention consists of five members, the first member L1 of which and the last member L5 of which are each divergent lenses of low deviation and consist of low refractivity crown glass. The radii of curvature of the two lenses L1 and L5 are denoted by $r_1$ and $r_2$ and by $r_{10}$ and $r_{11}$, respectively. The face of the last member L5 which faces the plane of the image is concave. The second member L2 and the third member L3 are convergent lenses made of high refractivity crown glass, and have radii of curvature $r_3$ and $r_4$, and $r_5$ and $r_6$, respectively. The fourth member L4 consists of a convergent lens L4a with radii of curvature $r_7$ and $r_8$ and of a divergent lens L4b with radii of curvature $r_8$ and $r_9$, which are cemented to each other. The types of glass which are used for this cemented member L4 have a very low difference in refractive index but a very high difference in dispersion, wherein the convergent lens L4a has a low dispersion and the divergent lens L4b has a high dispersion. One of the two glass/air surfaces of the cemented member is aspherical. A diaphragm 6 is disposed between the third member L3 and the fourth member L4.

The thicknesses of the lenses are denoted by $d_1$, $d_3$, $d_5$, $d_7$, $d_8$ and $d_{10}$, and the air gaps between the lenses are denoted by $d_2$, $d_4$, $d_6$ and $d_9$.

A compact wide-angle lens such as this exhibits very good chromatic correction and image quality, which are not impaired even at short range. This compact wide-angle lens is equivalent to the known, conventional wide-angle lenses as regards image angle, aperture ratio and distortion.

According to a first embodiment, a compact wide-angle lens according to the invention, with a maximum aperture angle of at least 1: 5.6 and an image angle of 105°, is determined by the technical data listed in the following Table:

| Radii | Thicknesses and air gaps | Refractive indices $n_e$ | Abbe number $n_e$ |
|---|---|---|---|
| $r_1$ = 201.077 | | | |
| | $d_1$ = 3.400 | $n_1$ = 1.52583 | $v_1$ = 51.25 |
| $r_2$ = 33.369 | | | |
| | $d_2$ = 13.000 | | |
| $r_3$ = 37.300 | | | |
| | $d_3$ = 16.030 | $n_2$ = 1.75844 | $v_2$ = 52.09 |
| $r_4$ = 60.315 | | | |
| | $d_4$ = 11.636 | | |
| $r_5$ = 36.588 | | | |
| | $d_5$ = 3.200 | $n_3$ = 1.75844 | $v_3$ = 52.09 |
| $r_6$ = 43.742 | | | |
| | $d_6$ = 6.060 | | |
| $r_7$ = 98.970 | | | |
| | $d_7$ = 13.100 | $n_4$ = 1.59142 | $v_4$ = 61.03 |
| $r_8$ = −23.818 | | | |
| | $d_8$ = 4.700 | $n_5$ = 1.62408 | $v_5$ = 36.12 |
| $r_9$ = −42.216* | | | |
| | $d_9$ = 0.990 | | |
| $r_{10}$ = −40.465 | | | |
| | $d_{10}$ = 5.300 | $n_6$ = 1.50349 | $v_6$ = 56.13 |
| $r_{11}$ = 203.617 | | | |

*aspherical face

According to a second embodiment, a compact wide-angle lens according to the invention, with a maximum aperture angle of at least 1: 5.6 and an image angle of 105°, is determined by the technical data listed in the following Table:

| Radii | Thicknesses and air gaps | Refractive indices $n_e$ | Abbe number $n_e$ |
|---|---|---|---|
| $r_1$ = 169.672 | | | |
| | $d_1$ = 3.000 | $n_1$ = 1.52583 | $v_1$ = 51.25 |
| $r_2$ = 23.884 | | | |
| | $d_2$ = 8.465 | | |
| $r_3$ = 27.751 | | | |
| | $d_3$ = 12.860 | $n_2$ = 1.75844 | $v_2$ = 52.09 |
| $r_4$ = 44.624 | | | |
| | $d_4$ = 7.190 | | |
| $r_5$ = 28.382 | | | |
| | $d_5$ = 2.400 | $n_3$ = 1.75844 | $v_3$ = 52.09 |
| $r_6$ = 35.229 | | | |
| | $d_6$ = 4.535 | | |
| $r_7$ = 73.026 | | | |
| | $d_7$ = 10.470 | $n_4$ = 1.59142 | $v_4$ = 61.03 |
| $r_8$ = −17.622 | | | |
| | $d_8$ = 3.500 | $n_5$ = 1.62408 | $v_5$ = 36.12 |
| $r_9$ = −31.197* | | | |
| | $d_9$ = 1.360 | | |
| $r_{10}$ = −30.837 | | | |
| | $d_{10}$ = 3.300 | $n_6$ = 1.50349 | $v_6$ = 56.13 |
| $r_{11}$ = 152.036 | | | |

*aspherical face

What is claimed is:

1. A compact wide-angle lens, consisting of five members, wherein the first member (L1) and the last member (L5) are each divergent lenses of low deviation made of low refractivity crown glass, and the second member (L2) and the third member (L3) are convergent lenses made of high refractivity crown glass, and consisting of a diaphragm (6) between the third member (L3) and the fourth member (L4), characterised in that the fourth member (L4) consists of a convergent lens (L4a) and a divergent lens (L4b) which are cemented to each other, that the fourth member (L4) is manufactured from types of glass which have a very low difference in refractive index but a very high difference in dispersion, so that the convergent lens (L4a) has a low dispersion and the divergent lens (L4b) has a high dispersion, that one of the two glass/air surfaces of the fourth member (L4) is aspherical and that the face of the last member (L5) which faces the plane of the image is concave.

2. A compact wide-angle lens according to claim 1, characterised by the following data:

| | maximum aperture ratio at least 1:5.6 image angle 105° | | |
|---|---|---|---|
| Radii | Thicknesses and air gaps | Refractive indices $n_e$ | Abbe number $n_e$ |
| $r_1$ = 201.077 | | | |
| | $d_1$ = 3.400 | $n_1$ = 1.52583 | $v_1$ = 51.25 |
| $r_2$ = 33.369 | | | |
| | $d_2$ = 13.000 | | |
| $r_3$ = 37.300 | | | |
| | $d_3$ = 16.030 | $n_2$ = 1.75844 | $v_2$ = 52.09 |
| $r_4$ = 60.315 | | | |
| | $d_4$ = 11.636 | | |
| $r_5$ = 36.588 | | | |
| | $d_5$ = 3.200 | $n_3$ = 1.75844 | $v_3$ = 52.09 |
| $r_6$ = 43.742 | | | |
| | $d_6$ = 6.060 | | |
| $r_7$ = 98.970 | | | |
| | $d_7$ = 13.100 | $n_4$ = 1.59142 | $v_4$ = 61.03 |
| $r_8$ = −23.818 | | | |
| | $d_8$ = 4.700 | $n_5$ = 1.62408 | $v_5$ = 36.12 |
| $r_9$ = −42.216* | | | |
| | $d_9$ = 0.990 | | |
| $r_{10}$ = −40.4.65 | | | |
| | $d_{10}$ = 5.300 | $n_6$ = 1.50349 | $v_6$ = 56.13 |
| $r_{11}$ = 203.617 | | | |

*aspherical face.

3. A compact wide-angle lens according to claim 1, characterised by the following data:

| | maximum aperture ratio at least 1:5.6 image angle 105° | | |
|---|---|---|---|
| Radii | Thicknesses and air gaps | Refractive indices $n_e$ | Abbe number $n_e$ |
| $r_1$ = 169.672 | | | |
| | $d_1$ = 3.000 | $n_1$ = 1.52583 | $v_1$ = 51.25 |
| $r_2$ = 23.884 | | | |
| | $d_2$ = 8.465 | | |
| $r_3$ = 27.751 | | | |
| | $d_3$ = 12.860 | $n_2$ = 1.75844 | $v_2$ = 52.09 |
| $r_4$ = 44.624 | | | |
| | $d_4$ = 7.190 | | |
| $r_5$ = 28.382 | | | |
| | $d_5$ = 2.400 | $n_3$ = 1.75844 | $v_3$ = 52.09 |
| $r_6$ = 35.229 | | | |
| | $d_6$ = 4.535 | | |
| $r_7$ = 73.026 | | | |
| | $d_7$ = 10.470 | $n_4$ = 1.59142 | $v_4$ = 61.03 |
| $r_8$ = −17.622 | | | |
| | $d_8$ = 3.500 | $n_5$ = 1.62408 | $v_5$ = 36.12 |
| $r_9$ = −31.197* | | | |
| | $d_9$ = 1.360 | | |
| $r_{10}$ = −30.837 | | | |
| | $d_{10}$ = 3.300 | $n_6$ = 1.50349 | $v_6$ = 56.13 |
| $r_{11}$ = 152.036 | | | |

*aspherical face.

* * * * *